United States Patent [19]
Meyer et al.

[11] 4,355,145
[45] Oct. 19, 1982

[54] FURAN RESINS OF IMPROVED FIRE RESISTANCE

[75] Inventors: Nicolas Meyer, Bully Les Mines; Michel Cousin, Loison Sous Lens, both of France

[73] Assignee: Societe Chimique des Charbonnages SA, Paris La Defense, France

[21] Appl. No.: 256,367

[22] Filed: Apr. 22, 1981

[30] Foreign Application Priority Data

Apr. 24, 1980 [FR] France ............................. 80 9194

[51] Int. Cl.$^3$ ............................ C08F 4/52; C08J 3/24
[52] U.S. Cl. ................................... 526/195; 252/428; 526/270
[58] Field of Search ......................... 526/195; 252/428

[56] References Cited

U.S. PATENT DOCUMENTS

| 2,024,568 | 12/1933 | Engel | 526/195 |
|---|---|---|---|
| 2,413,777 | 1/1947 | Oakley et al. | 260/683.4 |
| 2,419,057 | 4/1947 | Clifford | 526/195 |
| 3,306,860 | 2/1967 | Rowell et al. | 252/432 |
| 3,347,916 | 10/1967 | Huber | 260/561 |
| 3,679,710 | 7/1972 | Forster | 260/346.3 |
| 3,843,526 | 10/1974 | Roth et al. | 252/8.1 |
| 4,043,950 | 8/1977 | Wilmsen | 260/2.5 F |
| 4,123,414 | 10/1978 | Milette | 260/38 |
| 4,184,969 | 1/1980 | Bhat | 252/8.1 |
| 4,254,294 | 3/1981 | Jequien et al. | 526/195 |
| 4,272,403 | 6/1981 | Meyer et al. | 252/428 |
| 4,283,462 | 8/1981 | Meyer et al. | 428/506 |
| 4,289,662 | 9/1981 | Blasius | 252/607 |

FOREIGN PATENT DOCUMENTS

| 1230618 | 9/1960 | France . |
| 1524731 | 5/1968 | France . |
| 2016760 | 5/1970 | France . |
| 2246596 | 5/1975 | France . |
| 2250796 | 6/1975 | France . |
| 2352021 | 12/1975 | France . |
| 2331587 | 6/1977 | France . |
| 2426559 | 12/1979 | France . |
| 1144192 | 3/1969 | United Kingdom . |
| 1272566 | 5/1972 | United Kingdom . |

Primary Examiner—Joseph L. Schofer
Assistant Examiner—Peter F. Kulkosky
Attorney, Agent, or Firm—Millen & White

[57] ABSTRACT

Furan resins of improved fire resistance are produced by curing the resins with a substantially anhydrous solution of boric anhydride, an organic solvent and a concentrated acid.

10 Claims, No Drawings

FURAN RESINS OF IMPROVED FIRE RESISTANCE

CROSS REFERENCE TO RELATED APPLICATIONS

Concurrently filed by the same inventors is an application entitled "LAMINATES OF IMPROVED FIRE RESISTANCE", Ser. No. 256,368 filed Apr. 22, 1981 based on French Application No. 80/9192, filed Apr. 24, 1980, the contents being incorporated by reference herein.

BACKGROUND OF THE INVENTION

The present invention relates to the polymerization of furan resins, and more particularly to the hardening or curing of furan resins in the presence of a particular catalyst.

Furan resins obtained by condensing one or more furan alcohols have been known for at least about forty years. The condensation of furan alcohol achieved in the presence of an acid catalyst yields a poly (furfuryl alcohol) which is a viscous liquid. This liquid is hardened by using an acidic catalyst such as an inorganic acid, for instance, phosphoric acid, sulfuric acid or hydrochloric acid or an organic acid, for example, benzenesulfonic acid, phenolsulfonic acid, paratoluenesulfonic acid or a mixture of these organic acids with inorganic acids.

Furan resins are used for the manufacture of many composite articles reinforced with suitable agents such as sand and glass fibers. Glass fibers are particularly suitable for the manufacture of furan laminate articles, but the hardening of furan resins by using known acidic catalyst yields articles which are very porous. Furan resins are also used to manufacture laminated articles comprising a layer of phenolic resin, reinforced with glass fiber mats and coated on one side or on two sides with a furan resin layer bonded optionally to a thermosetting resin, for example, a polyester resin. In this case, the laminates obtained by the hardening of furan resins with aqueous acidic solutions exhibit poor fire resistance on the furan layer side.

SUMMARY OF THE INVENTION

An object of this invention is to provide furan resin containing layers having fire resistance and a process of producing said layers.

Upon further study of the specification and appended claims, further objects and advantages of this invention will become apparent to those skilled in the art.

To attain these objects, there is provided a process of hardening furan resins with acidic catalysts, the improvement being that the hardening of the furan resins is achieved in the presence of a substantially, if not completely, anhydrous concentrated boric anhydride solution containing at least 5 percent by weight of boric anhydride, one or more organic solvents, and at least one concentrated acid.

DETAILED DISCUSSION

Substantially, if not completely, anhydrous concentrated boric anhydride solutions suitable for the process of the present invention are solutions which are described in French patent application 78.18279 filed on June 19, 1978 now French Pat. No. 2,434,118 issued Mar. 21, 1980 and its addition 79 23888 filed on Sept. 26, 1979, as well as U.S. application Ser. No. 049,009, filed June 25, 1979 now U.S. Pat. No. 4,272,403 issued June 9, 1981, all of said applications being incorporated herein. These solutions contain at least 5 percent by weight of boric anhydride, one or more organic solvents selected from mono or polyalcohols, trialkylborates, dialkylacetal of formol and at least one acid selected from concentrated sulfuric acid and sulfonic aromatic acid. Preferably, these solutions contain 10 to 35 percent by weight of boric anhydride, 15 to 50 percent by weight of the concentrated acid and 30 to 60 percent by weight or organic solvent. According to the invention, these solutions are used in amounts comprising between 0.5 and 10 percent by weight and preferably between 1 and 6 percent by weight based on the amount of furan resin. Anhydride solutions having high concentrations of acids, e.g., at least 20 percent by weight, are preferred to reduce the amount of solvent.

Furan resins used according to the present invention are known resins obtained by condensing furfuryl alcohol with an acid. The resultant products are black products having a viscosity ranging between 50 and 15,000 centipoises. In order to reduce the viscosity of furan resin, it is possible to add furfuryl.

The process of the present invention is suitable for the manufacture of various articles, in particular fiber glass reinforced laminates. Suitable forms of fiber glass are known forms such as cut-fiber sheets, glass voiles, and other cut and woven glass fiber material.

According to the process of the present invention, there are prepared articles having a low porosity and an excellent oxygen index. Such articles exhibit excellent fire resistance due to the absence of water in the catalyst used in the process of the present invention.

Moreover, the present invention can provide laminates of improved fire resistance, details being provided in the application referred to above in the section entitled "CROSS REFERENCE TO RELATED APPLICATIONS". According to this patent application, laminates described hereinabove having an improved fire resistance are obtained when furan resin is hardened in the presence of a concentrated anhydrous boric anhydride solution. By using this catalyst there is obtained an article classified totally as M 1 or M 2, whereas the coating layer of an unsaturated polyester resin is by itself classified only as M 3 or M 4. The fire resistance classifications are determined by using an epiradiator according to the method described in "Journal Officiel" (Official Journal—French) of July 26, 1973 (decree of June 4, 1973).

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLES

EXAMPLE 1

A fiber-glass mat was impregnated by brushing furan resin on a mold which had been preliminarily treated with a mold release agent. The furan resin was furfuryl alcohol condensed in acid medium; this resin is sold by the firm QUAKER OATS under the Trademark QUACOR 1001.

100 parts by weight of the furan resin were used and the ratio by weight $$\frac{\text{fiber-glass mat}}{\text{furan resin}} \text{ was equal to } \tfrac{1}{3}.$$

Furan resin was hardened by using 3.5 parts by weight of a boric anhydride solution consisting essentially of:

| Trimethylborate | 100 parts |
| --- | --- |
| Boric anhydride | 60 parts |
| Para-toluene sulfonic acid | 60 parts |

The gel-time of the resin was 20 hours. An "annealing" treatment was imparted to the resultant article at 70° C. for 2 hours. After this treatment, the resultant article had an oxygen index equal to 31.7 (French Standard NF T 57 071). Moreover, its porosity was low.

EXAMPLE 2

EXAMPLE 1 was repeated by using 5 parts by weight of the anhydrous boric anhydride solution of EXAMPLE 1 instead of 3.5 parts. After treatment as described in EXAMPLE 1, an article having an oxygen index equal to 34.1 was obtained.

EXAMPLE 3 (Comparative example)

EXAMPLE 1 was repeated except that 3.5 parts by weight of a known catalyst for hardening furan resin were used.

This catalyst was a paratoluene-sulfonic acid solution containing 65 percent by weight of acid. Gel-time of the furan resin was equal to 2 hours 30 minutes.

After treatment as described in EXAMPLE 1, there was obtained an article having an oxygen index equal to 28.2. Moreover, the obtained article was more porous than the articles obtained in EXAMPLES 1 and 2.

EXAMPLE 4

A layer of unsaturated polyester resin having a thickness of 0.2 millimeters was laid by brushing on a mold which had been preminarily treated with a conventional mold release agent. The polyester resin was of the isophthalic acid type and contained trichloroethylphosphate and titanium dioxide. This resin was hardened by using known peroxides, and a cobalt salt was added as an accelerator. This polyester layer was classified M 3 according to French Standard NF P 92501, meaning that this material is "moderately-inflammable". (The behavior to fire was determined by using an epiradiator.)

A layer of furan resin of 0.2 millimeter of thickness was deposited by brushing on the layer of polyester resin which was partly hardened. The furan resin had the following composition:

| Condensate of furfuryl alcohol in acid medium (Resin Quaccor 1001 - Trademark of Quaker Oats | 100 parts |
| --- | --- |
| Pyrogenous silica | 2 parts |
| Boric anhydride solution consisting essentially of: | 1.5 parts |
| Trimethylborate | 100 parts |
| Boric anhydride | 60 parts |
| Para-toluene sulfonic acid | 60 parts |

-continued

| Sulfuric acid | 6 parts |
| --- | --- |

The furan resin layer was hardened at room temperature for 20 minutes: the surface was slightly sticky. A fiber-glass mat was deposited, then a phenolic resin. The phenolic resin was obtained by condensing formaldehyde (formol) with phenol in a molar ratio $$\frac{\text{formol}}{\text{phenol}} = 1.5;$$

its viscosity was 10 poises at 20° C. 100 parts by weight of the resultant phenolic resins were hardened by using 10 parts of an aqueous 65% by weight paratoluene-sulfonic acid solution. The phenolic resin was deposited on a fiber-glass mat by using a roller. The ratio by weight $$\frac{\text{fiber-glass mat}}{\text{phenolic resin}} \text{ equalled } \tfrac{1}{3}.$$

The resultant laminate was hardened at room temperature for 4 hours, and was withdrawn from the mold. The obtained laminate was classified "M 2" on the polyester gel-coat side (according to NF P 92501 using the epiradiator). This classification means that the laminate is "Inflammable with difficulty".

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process of hardening furan resins by using acidic catalysts, the improvement which comprises using as the acidic catalyst a substantially anhydrous concentrated boric anhydride solution comprising at least 5 percent by weight of boric anhydride, at least one organic solvent and at least one concentrated acid.

2. A process according to claim 1, wherein the amount of the catalyst solution used is from 0.5 to 10 percent by weight with respect to the furan resin.

3. A process according to claim 1, wherein the anhydrous boric anhydride solution comprises (1) at least 5 percent by weight of boric anhydride; (2) at least one solvent, the solvent being a monoalcohol, a polyalcohol, a trialkylborate, a dialkylacetal of formaldehyde or a mixture thereof; and (3) from 5 to 70 percent by weight, based on the weight of the solution, of sulfuric acid, a sulfonic acid or a mixture thereof.

4. A process according to claim 3, wherein the amount of the catalyst solution used is from 0.5 to 10 percent by weight with respect to the furan resin.

5. A process according to claim 2, wherein said amount is from 1 to 6 percent by weight.

6. A hardened furan resin as obtained by the process of claim 1.

7. A hardened furan resin as obtained by the process of claim 2.

8. A hardened furan resin as obtained by the process of claim 3.

9. A hardened furan resin as obtained by the process of claim 4.

10. A hardened furan resin as obtained by the process of claim 5.

* * * * *